United States Patent
Tsai et al.

(10) Patent No.: US 7,953,153 B2
(45) Date of Patent: May 31, 2011

(54) MOTION ESTIMATION METHOD UTILIZING MODIFIED RHOMBUS PATTERN SEARCH FOR A SUCCESSION OF FRAMES IN DIGITAL CODING SYSTEM

(75) Inventors: Chang-Che Tsai, Hsinchu Hsien (TW); Chih-Hsin Lin, Hsinchu Hsien (TW); Yi-Fang Lee, Hsinchu Hsien (TW); Tzu-Yi Chao, Hsinchu Hsien (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 1471 days.

(21) Appl. No.: 11/365,288

(22) Filed: Mar. 1, 2006

(65) Prior Publication Data

US 2006/0209956 A1    Sep. 21, 2006

(30) Foreign Application Priority Data

Mar. 21, 2005  (TW) ................. 94108599 A

(51) Int. Cl.
*H04N 7/12* (2006.01)
(52) U.S. Cl. .................................... 375/240.16
(58) Field of Classification Search ............. 375/240.01, 375/240.12, 240.16, 240.23, 240.24
See application file for complete search history.

(56) References Cited

U.S. PATENT DOCUMENTS

| | | | |
|---|---|---|---|
| 6,263,025 B1 * | 7/2001 | Iizuka | 375/240.16 |
| 7,187,803 B2 * | 3/2007 | Hanami | 382/236 |
| 7,327,787 B1 * | 2/2008 | Chen et al. | 375/240.16 |

OTHER PUBLICATIONS

A Modified Estimation Algorithm-Pseudo Diamond Search Method, Journal; of Image and Graphics, vol. 7, No. 11, Nov. 2002.
A Novel Cross-Diamond Search Algorithm for Fast Block Motion Estimation, IEEE Transactions on Circuit and System for Video Technology, vol. 12, No. 12, Dec. 2002, Chun-Ho Cheung and Lai-Man Po.
Novel Cross-Diamond-Hexagonal Search Algorithm for Fast Block Motion Estimation, IEEE Transactions on Multimedia, vol. 7, No, 1, Feb. 2005, Chun-Ho Cheung and Lai-Man Po.

\* cited by examiner

*Primary Examiner* — Khanh C Tran
(74) *Attorney, Agent, or Firm* — Tung & Associates

(57) ABSTRACT

A motion estimation method for a succession of frames in a digital coding system includes: a) with reference to a first block in a first frame, searching a second frame for a second block that corresponds to the first block; and b) estimating a motion vector of the first block on the basis of the second block in the second frame; wherein step a) includes: a1) forming a first initial search range including a virtual rhombus-shaped pattern substantially centered at a pre-determined block, and a2) expanding progressively outward a second initial search range based on the virtual rhombus-shaped pattern.

9 Claims, 6 Drawing Sheets

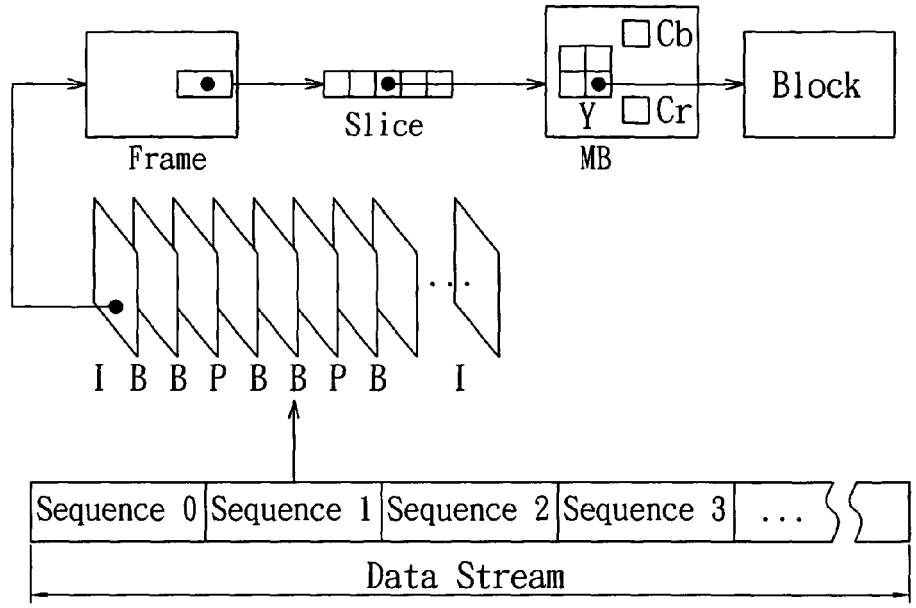
FIG. 1
PRIOR ART
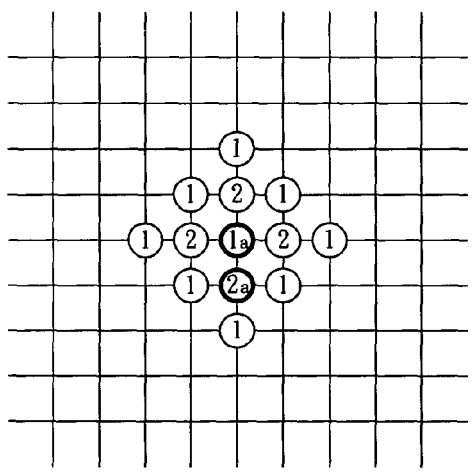 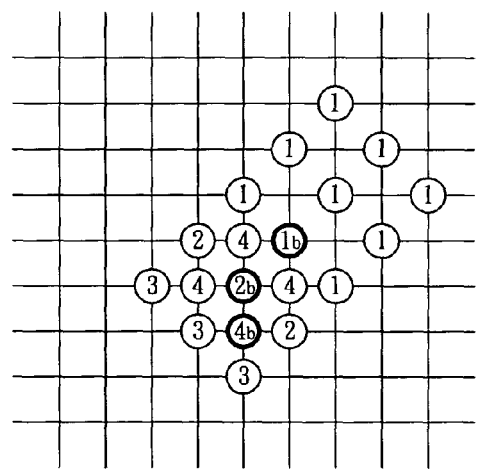
FIG. 2A
PRIOR ART
FIG. 2B
PRIOR ART

MOTION ESTIMATION METHOD UTILIZING MODIFIED RHOMBUS PATTERN SEARCH FOR A SUCCESSION OF FRAMES IN DIGITAL CODING SYSTEM

CROSS-REFERENCE TO RELATED APPLICATION

This application claims priority of Taiwanese Application No. 094108599, filed on Mar. 21, 2005.

BACKGROUND OF THE INVENTION

1. Field of the Invention

The invention relates to a motion estimation method in video processing, more particularly to a motion estimation method utilizing a modified rhombus pattern search for a succession of frames in a digital coding system.

2. Description of the Related Art

Referring to FIG. 1, the data structure of a data stream of an MPEG coded video is shown to be formed from one or more sequences. Each sequence includes one or several groups of pictures (GOP), which refers to a group consisting of a plurality of pictures or frames. These pictures or frames can be classified into three types, i.e., intra-coded frames (I frame), predictive-coded frames (P frame), and bi-directionally predictive-coded frames (B frame), according to their attributes.

Each of the aforesaid frames can be encoded. Generally, I frames are used as cut-in points during video compression. A P frame can be predicted through motion estimation using an I frame or another P frame as a reference frame, whereas a B frame can be predicted from the motion vectors generated by both an I frame and a P frame or by two P frames which serve as reference frames. Thus, by presenting the frames successively, the MPEG video can be presented to a user.

In MPEG compression standards, each frame is divided into a plurality of slices. Each slice is further divided into a plurality of macroblocks (MB). Each macroblock is composed of four luminance blocks and a plurality of chrominance blocks. Each block is defined as the smallest coded unit of the MPEG data structure. The corresponding inverse operation of motion compensation in MPEG video coding is motion estimation. The most direct way of implementing motion estimation is to record the luminance and chrominance of each pixel in a macroblock or in a block, and use the information in a full search to find the best matched motion vector in the search area. However, such a scheme involves consumption of large amounts of resources.

With the use of motion estimation, the blocks in the current frame can be reconstructed by 1) shifting the best-matched blocks in the reference frame with the motion vectors found in the aforesaid motion estimation as well as 2) the small differential data between blocks in the current frame and best-matched blocks in the reference frame. Since it is not necessary to store a large amount of redundant data, the amount of stored data can be reduced to thereby achieve the object of data compression. Current motion estimation methods include the Full Search (FS), the Three-Step Search (TSS), the Four-Step Search (FSS), and the Diamond Search (DS).

In the conventional Diamond Search (DS), a search area in either one of the two diamond patterns is searched. This search scheme involves the following steps:

Step 1: An origin point and eight other points that surround the origin point and that lie on the boundary of a hollow diamond-shaped search area are found so that there are altogether nine search points. If the best matched point is found to be at the center of the search area, the flow proceeds to step 4.

On the other hand, if the best matched point is found to be on the boundary of the search area, the flow proceeds to step 2.

Step 2: Set the center to the best matched point found in step 1, and continue the search using the hollow diamond-shaped search area.

Step 3: If the best matched point is still found to be at the center of the new search area, step 4 is performed. On the other hand, if the new best matched point is found to be on the boundary of the new search area, step 2 is repeated.

Step 4: The search area is reduced to a smaller solid diamond. The search is stopped because the (local) best matched point is found.

The aforesaid scheme is further illustrated with reference to FIG. 2A. In step 1, the initial best matched point is found to be at the center (1a) of the search area, and step 4 is therefore performed in the reduced search area, a smaller solid diamond. The search is ended when the (local) best-matched point (2a) is located.

Referring to FIG. 2B, when the initial best matched point (1b) in step 1 is found to be located on the boundary of the search area, step 2 is performed to form another hollow diamond-shaped search area centered at the initial best matched point (1b). Then step 3 is performed. Since the new best matched point (2b) is found to lie on the boundary of the new search area, step 2 is repeated to form yet another hollow diamond-shaped search area centered at the new best matched point (2b). When it is found that the latest best matched point is located at the center of the search area, step 4 is performed in the reduced search area, a smaller solid diamond. The search is ended when the ideal point (4b) is found.

However, in the conventional diamond search scheme, as the search begins with blocks on the boundary of a larger hollow diamond centered at an origin point before searching blocks in a smaller solid diamond, where probabilities that the best matched block is located are higher, the search efficiency is relatively low.

SUMMARY OF THE INVENTION

Therefore, the object of the present invention is to provide a motion estimation method utilizing a modified diamond search for a succession of frames in a digital coding system so as to increase search efficiency.

Accordingly, a motion estimation method utilizing a modified rhombus pattern search for a succession of frames in a digital coding system comprises:

a) with reference to a first block in a first frame, searching within at least one portion of a second frame for a second block that corresponds to the first block; and b) estimating a motion vector of the first block with respect to the second block in the second frame;

wherein step a) includes: a1) forming a first initial search range including a virtual rhombus-shaped pattern substantially centered at a pre-determined block, and a2) expanding progressively outward a second initial search range based on the virtual rhombus-shaped pattern or a subset of virtual rhombus-shaped patterns.

BRIEF DESCRIPTION OF THE DRAWINGS

Other features and advantages of the present invention will become apparent in the following detailed description of the preferred embodiments with reference to the accompanying drawings, of which:

FIG. 1 is a schematic diagram showing the data structure of an MPEG coded video;

FIGS. 2A and 2B are schematic diagrams to illustrate a conventional Diamond Search (DS) determination scheme;

DETAILED DESCRIPTION OF THE PREFERRED EMBODIMENTS

Figure 3:
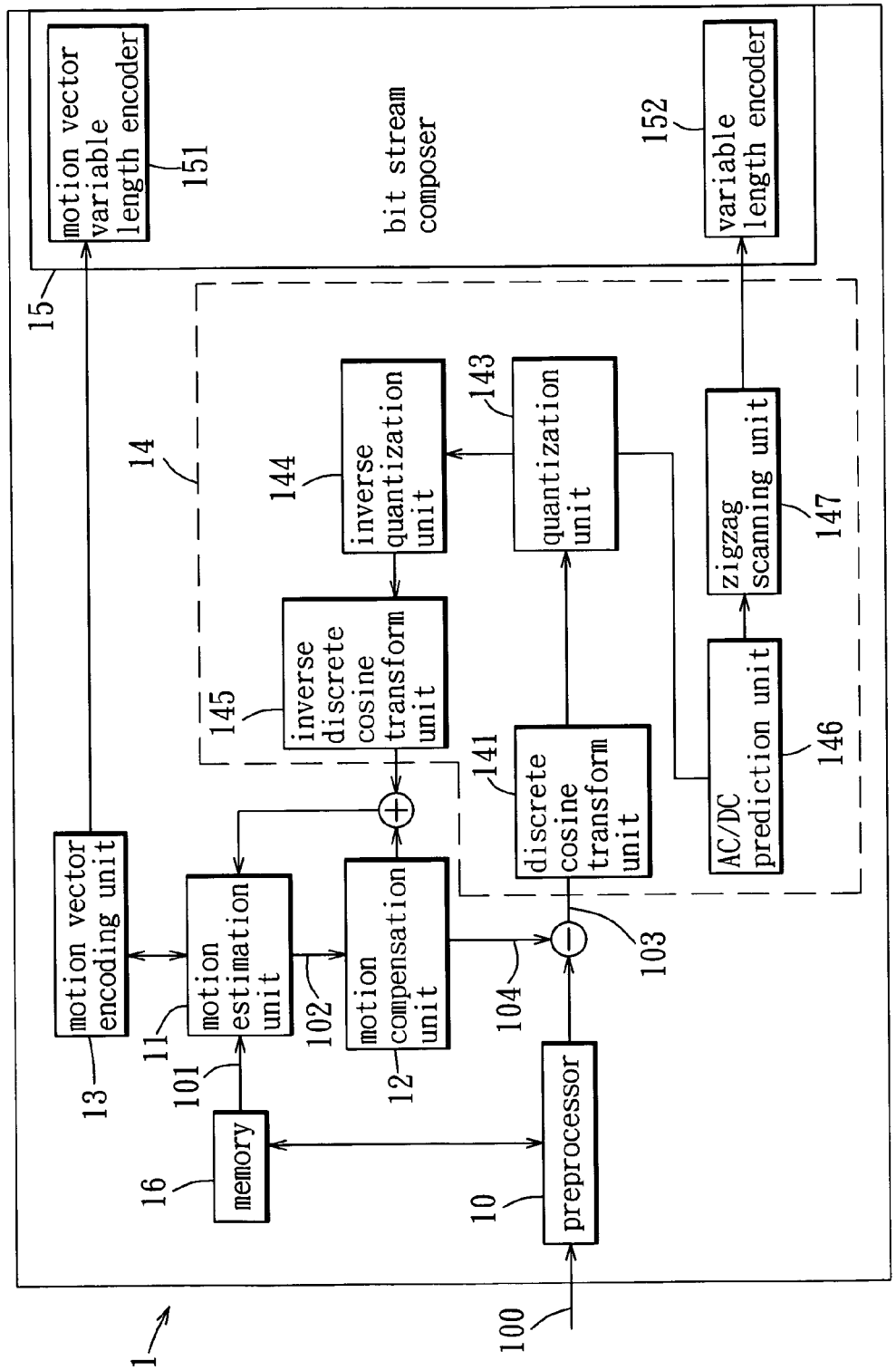
FIG. 3 is a schematic block diagram of a system in the form of a video coding device capable of MPEG video encoding that uses the method of this invention.

Referring to FIG. 3, a system for implementing the motion vector estimation method according to the present invention is shown to be embodied in a video coding device 1 capable of MPEG video compression. However, it should be apparent to those skilled in the art that the present invention may also be applied to a processing system that performs functions similar to video compression.

The video coding device 1 includes a preprocessor 10, a motion estimation unit 11, a motion compensation unit 12, a motion vector encoding unit 13, a texture encoding unit 14, a bit stream composer 15, and a memory 16.

When an image 100 is input into the video coding device 1, the preprocessor 10 initially defines the data of each macroblock in a given frame for temporary storage in the memory 16. Thereafter, the motion estimation unit 11 calculates the data of the macroblocks in the given frame of the image 100, e.g., motion vector data 102 of the blocks in the entire frame can be obtained by calculating the data 101 of the corresponding blocks in two adjacent frames for subsequent input into the motion compensation unit 12. The motion compensation unit 12 retrieves macroblock data from a preceding or succeeding frame using the motion vectors so as to obtain reference data 104. By subtracting the reference data 104 obtained by the motion compensation unit 12 from the macroblock data of the image 100 obtained by the preprocessor 10, differential data 103 can be obtained. The differential data 103 undergo computation by the texture encoding unit 14 to obtain compressed texture and reconstructed reference data.

The texture encoding unit 14 has a discrete cosine transform unit 141 which applies discrete cosine transform (DCT) to the pixels of each block, and converts the DCT-pixel data from the spatial domain to the frequency domain. Then, a quantization unit 143 is employed to perform a quantization step to quantize DCT coefficients and to remove high-frequency portions. Moreover, an inverse quantization unit 144 and an inverse discrete cosine transform unit 145 are used to perform inverse quantization and inverse discrete cosine transform computations for feedback to the motion estimation unit 11. The motion vector encoding unit 13 encodes and outputs each of the motion vectors to a variable length encoder 151 of the bit stream composer 15.

Furthermore, an alternating current/direct current (AC/DC) prediction unit 146 is required to remove redundant information of blocks in the same frame. A zigzag scanning unit 147 is then used to perform a zigzag scan to rearrange the quantized DCT coefficients such that the low-frequency coefficients are placed in the front whereas the high-frequency coefficients are placed at the back. Thereafter, the rearranged DCT coefficients are subjected to run length coding (RLC). Finally, another variable length encoder 152 of the bit stream composer 15 is used to perform variable length coding (VLC) on both the low-frequency coefficients and the high-frequency coefficients for composition by the bit stream composer 15, thereby completing output in the MPEG compression format.

Figure 4:
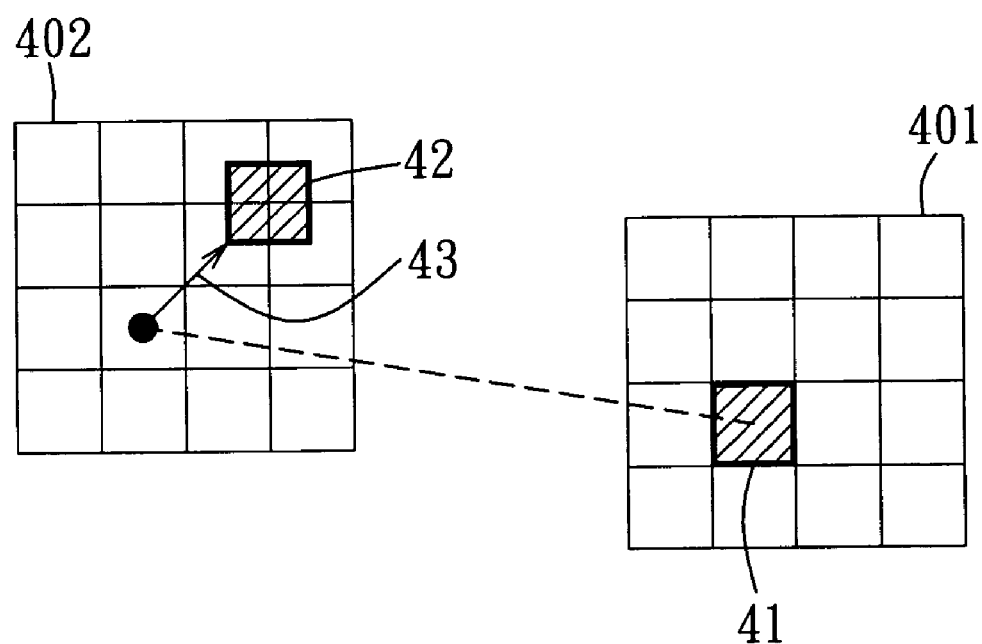
FIG. 4 is a brief illustration to illustrate a motion estimation method utilizing a modified rhombus pattern search according to the present invention.

Referring to FIGS. 3 and 4, the preferred embodiment of a motion estimation method utilizing a modified rhombus pattern search according to the present invention is adapted to be implemented in the motion estimation unit 11 of the video coding device 1. In the method of this invention, with reference to a first block 41 in a first frame 401 (also referred to as a current frame), a second frame 402 (also referred to as a reference frame) adjacent to the first frame 401 is searched to find a second block 42 corresponding to the first block 41. A motion vector 43 of the first block 41 is then estimated on the basis of the second block 42. In the method, a first initial search range including a virtual rhombus-shaped pattern substantially at a candidate pre-determined origin block is first formed in the second frame 402, and candidate blocks in the first initial search range are searched to locate a best matched block. The first initial search range is expanded progressively outward to form a second initial search range, and candidate blocks in the second initial search range are searched to locate a new best matched block, if the best matched block is on a boundary of the first initial search range.

In the preferred embodiment, the first initial search range is formed by the candidate origin block and virtual rhombus-shaped candidate blocks, or a subset of virtual rhombus-shaped candidate blocks neighboring the candidate origin block, and the second initial search range is a virtual rhombus-shaped search range that is centered at the best matched block found in the first initial search range and that overlaps partly the first initial search range.

In the preferred embodiment, an expanded search range, which is a rhombus-shaped search range that is centered at a latest best matched block and that overlaps partly a previous expanded search range, is formed and searched if the latest best matched block is found to be on a boundary of the previous expanded search range. Preferably, the expanded search range is formed and searched if the latest best matched block is found on the boundary of the expanded search range after searching only un-searched candidate blocks (which may include three or five candidate blocks) on the boundary of the expanded search range. In addition, the candidate blocks in the inner part of the expanded search range are searched only when the latest best matched block is found not to be on the boundary of the expanded search range.

The second frame 402 to be searched has a temporal relation with the first frame 401, i.e., the second frame 402 precedes or succeeds the first frame 401 in a temporal sequence. Moreover, searching of a search range preferably proceeds along a spiral path that moves in either a clockwise or counterclockwise direction.

Figure 5:
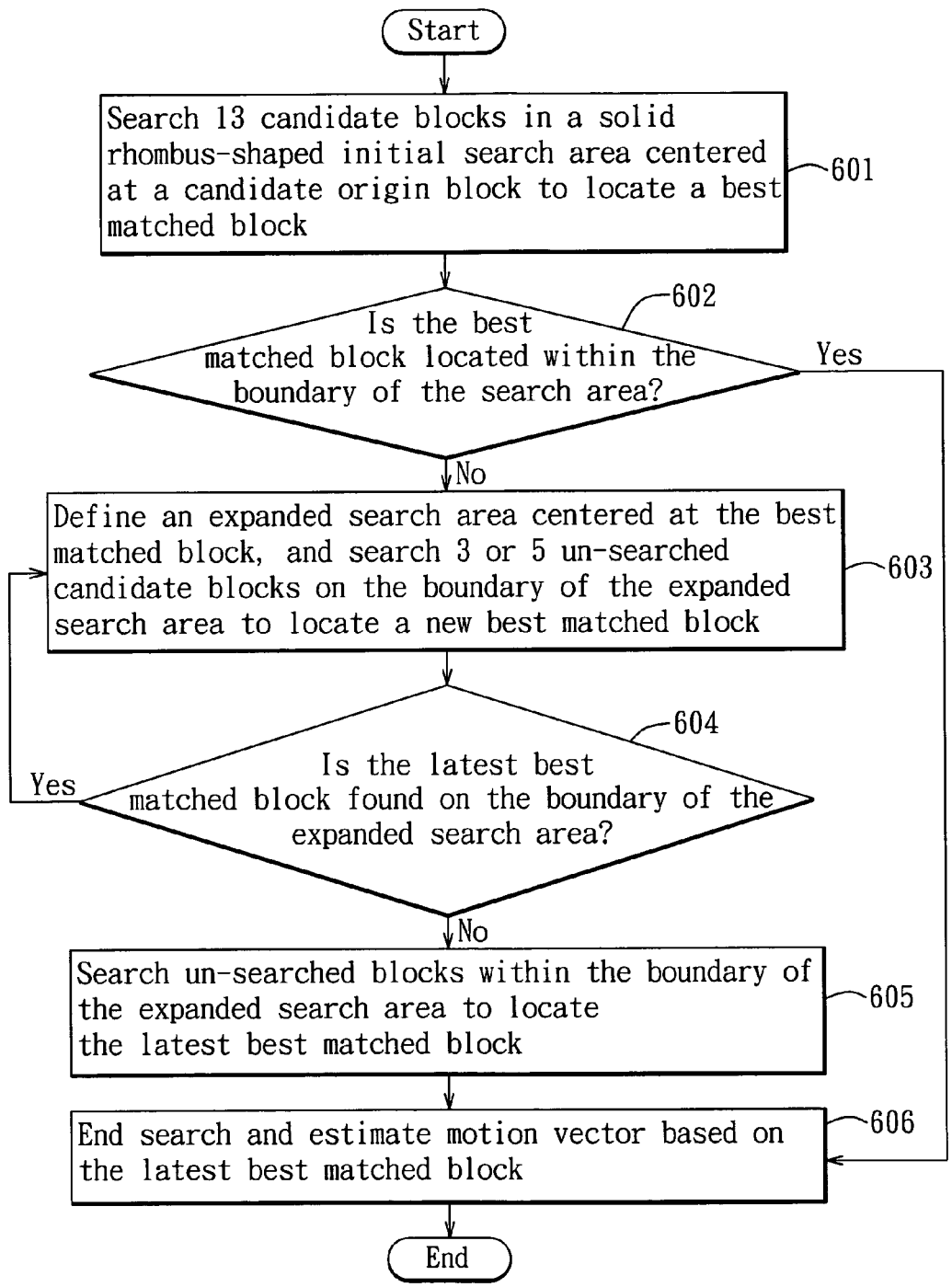
FIG. 5 is a flowchart illustrating the steps of the motion estimation method utilizing a modified rhombus pattern search according to the present invention.

Referring to FIG. 5, which is a flowchart of the preferred embodiment of the motion estimation method utilizing a modified rhombus pattern search according to the present invention, in step 601, an initial search range including a virtual rhombus-shaped pattern substantially centered at a candidate pre-determined origin block is defined, and all thirteen candidate blocks in the initial search range are searched to locate a best matched block. Then, step 602 is performed to determine whether the best matched block is located in the inner part of the initial search range. If it is determined in step 602 that the best matched block is located in the inner part of the initial search range, i.e., the best matched block is one of the five candidate blocks in the smaller inner rhombus, the flow skips to step 606 to terminate the search and to estimate the motion vector on the basis of the best matched block thus located. If it is otherwise determined that the best matched block lies on the boundary of the initial search range, i.e., the best matched block is one of the eight candidate blocks bounding the initial search range, the flow proceeds to step 603. In step 603, an expanded search range based on the virtual rhombus-shaped pattern and centered at the best matched block found in step 601, which overlaps partly the initial search range, is defined, and un-searched candidate blocks on the boundary of the expanded search range are searched to locate a new best matched block. In particular, five un-searched candidate blocks (i.e., blocks 2; see FIG. 6C) lying on the boundary of the expanded search range will be searched if the best matched block found in step 601 is at a vertex of the first initial search range, whereas three un-searched candidate blocks (i.e., blocks 3; see FIG. 6B) lying on the boundary of the expanded search range will be searched if the best matched block found in step 601 is located on an edge of the initial search range.

Then, in step 604, it is determined whether the latest best matched block is found to be on the boundary of the expanded search range. In the negative, the flow proceeds to step 605 to search the un-searched candidate blocks within the expanded search range for the latest best matched block. The flow goes to step 606 thereafter. On the other hand, if the latest best matched block is determined to be located on the boundary of the expanded search range in step 604, the flow returns to step 603, in which a rhombus-shaped expanded search range that is centered at the latest best matched block and that overlaps partly the previous expanded search range, is formed, and three un-searched candidate blocks (blocks 3 in FIG. 6B) or five un-searched candidate blocks (blocks 3 in FIG. 6C) on the boundary of the expanded search range are searched depending on the relative position of the latest best matched block. The search is continued in this rhombic pattern until the best matched block is found to be located within the boundary of the latest expanded search range.

The method of this invention will be further illustrated with reference to FIGS. 6A, 6B and 6C, in combination with FIG. 5.

Figure 6A:
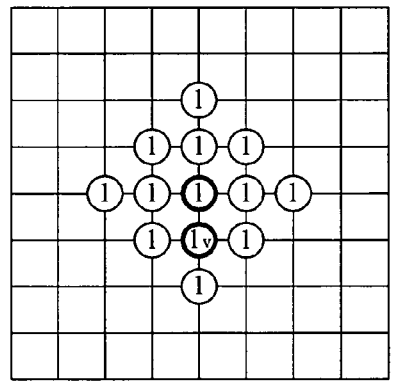
FIGS. 6A-6C are schematic diagrams to illustrate rhombus pattern search patterns adopted in the preferred embodiment of this invention.

Referring to FIG. 6A, a search is conducted through all thirteen candidate blocks 1 in an initial search range that includes a virtual rhombus-shaped pattern centered at a candidate origin block to locate a best matched block (step 601). Then, a determination is made as to whether the best matched block (1*v*) is located in the inner part of the initial search range, i.e., one of the five candidate blocks in the smaller inner rhombus. When the best matched block (1*v*) is found to be located in the inner part of the initial search range, the search is terminated, and the motion vector is estimated on the basis of the best matched block thus located (step 606).

Figure 6B:
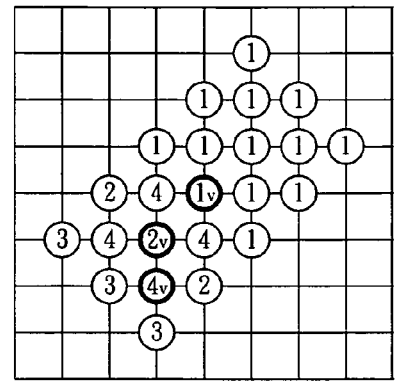
Figure 6C:
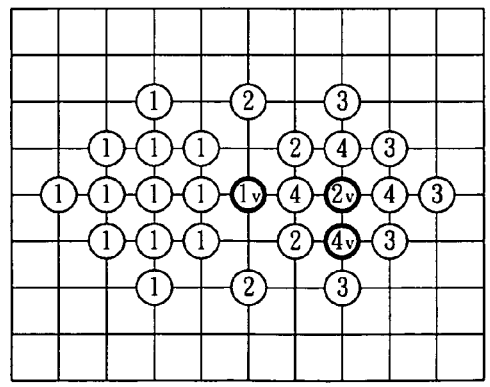

Referring to FIGS. 6B and 6C, a first search is conducted through all thirteen blocks 1 in a virtual rhombus-shaped initial search range to locate a best matched block (step 601). Since the best matched block (1*v*) is located on the boundary of the initial search range (step 602), a second search is performed using a virtual rhombus-shaped expanded search range that is centered at the best matched block (1*v*) and that overlaps partly the initial search range. In particular, the three un-searched candidate blocks 2 (FIG. 6B) or the five un-searched candidate blocks 2 (FIG. 6C) on the boundary of the expanded search range are searched to locate a latest best matched block (step 603). Then, a determination is made as to whether the latest best matched block (2*v*) is found to be on the boundary of the expanded search range (step 604). Since the latest best matched block (2*v*) is located on the boundary of the expanded search range, a third search is performed using a rhombus-shaped expanded search range that is centered at the best matched block (2*v*) and that overlaps partly the previous expanded search range. In particular, the three un-searched candidate blocks 3 (FIG. 6B) or the five un-searched candidate blocks 3 (FIG. 6C) lying on the boundary of the expanded search range are searched (step 603). As the latest best matched block (2*v*) is still the best matched block according to the result of the third search, i.e., the best matched block (2*v*) is now located in the inner part of the expanded search range, a fourth search is performed through the un-searched candidate blocks in the inner part of the expanded search range and closest to the best matched block (2*v*), and the latest best matched block (4*v*) is located (step 605). Thereafter, the search is terminated, and the motion vector is estimated on the basis of the latest best matched block (4*v*) (step 606).

Figure 7:
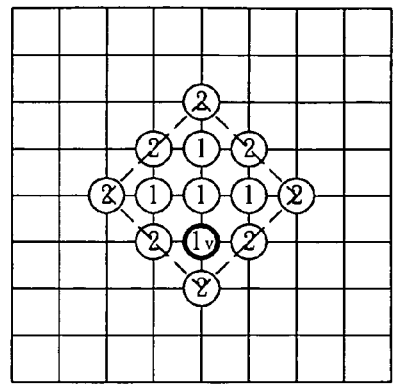
FIG. 7 is a schematic diagram illustrating a rhombus search pattern adopted in a modified preferred embodiment of a motion estimation method according to the present invention.
Figure 8:
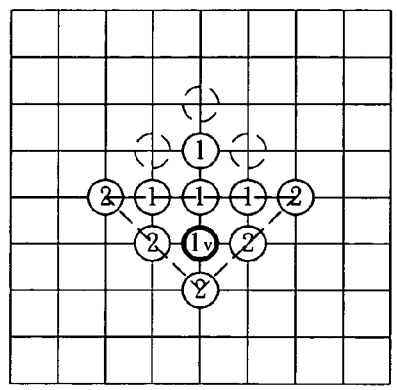
FIG. 8 is a schematic diagram illustrating a rhombus search pattern adopted in another modified preferred embodiment of a motion estimation method according to the present invention.
Figure 9:
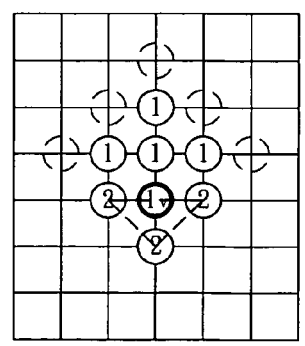
FIG. 9 is a schematic diagram illustrating a rhombus search pattern adopted in still another modified preferred embodiment of a motion estimation method according to the present invention.

FIGS. 7 to 9 illustrate search patterns adopted in alternative embodiments of the method according to the present invention.

In the alternative embodiment shown in FIG. 7, the candidate origin block and four candidate blocks neighboring the candidate pre-determined origin blocks define an initial search range. If the best matched block is found from one of the four candidate blocks surrounding the candidate origin block, the initial search range is expanded outwardly in a rhombic pattern to result in an expanded search range that includes eight un-searched candidate blocks surrounding the initial search range. The expanded search range is further expanded outwardly in this rhombic pattern relative to the candidate origin block to locate the best matched block until the block that corresponds to the first block 41 in the first frame 401 is found to be within the rhombic boundary of the latest expanded search range.

Similarly, in the alternative embodiment shown in FIG. 8, the candidate origin block and four candidate blocks neighboring the candidate pre-determined origin block define an initial search range. When the best matched block is found from one of the four candidate blocks surrounding the candidate origin block, the initial search range is expanded outwardly in a rhombic pattern to result in an expanded search range that includes five un-searched candidate blocks closest to the best matched block, depending on the relative position of the best matched block that was located. The expanded search range is further expanded outwardly in this rhombic pattern to locate the best matched block until the block that corresponds to the first block 41 in the first frame 401 is found to be in the inner part of the latest expanded search range.

The search pattern illustrated in FIG. 9 is similar to that depicted in FIG. 8. The difference resides in that, when the best matched block is one of the four candidate blocks surrounding the candidate pre-determined origin block, the initial search range is expanded outwardly in a rhombic pattern to result in an expanded search range that includes three un-searched candidate blocks which are adjacent to the best matched block, depending on the relative position of the best matched block that was located.

In sum, since motion vectors generally have radiating characteristics, in the motion estimation method according to the present invention, blocks in an initial search range including a virtual rhombus-shaped pattern are first searched, and the initial search range is expanded in a rhombic pattern with reference to a latest best matched block thus located. Since the search is first conducted in a rhombus-shaped initial search range, the present invention can save unnecessary search time, thereby enhancing the search efficiency.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A motion estimation method utilizing a modified rhombus pattern search for a succession of frames in a digital coding system, comprising:
    a) with reference to a first block in a first frame, searching within at least a portion of a second frame for a second block that corresponds to the first block; and
    b) estimating a motion vector of the first block with respect to the second block in the second frame;
    wherein step a) includes: a1) forming a first initial search range including a virtual rhombus-shaped pattern substantially centered at a pre-determined block, and a2) expanding progressively outward a second initial search range based on the virtual rhombus-shaped pattern, and
    wherein the first initial search range in step a1) is formed by a candidate origin block and a predetermined number of candidate blocks neighboring the candidate origin block.

2. The motion estimation method as claimed in claim 1, wherein the predetermined number is four.

3. The motion estimation method as claimed in claim 1, wherein the predetermined number is twelve.

4. A motion estimation method utilizing a modified rhombus pattern search for a succession of frames in a digital coding system, comprising:
    a) with reference to a first block in a first frame, searching within at least a portion of a second frame for a second block that corresponds to the first block; and
    b) estimating a motion vector of the first block with respect to the second block in the second frame:
    wherein step a) includes: a1) forming a first initial search range including a virtual rhombus-shaped pattern substantially centered at a pre-determined block, and a2) expanding progressively outward a second initial search range based on the virtual rhombus-shamed pattern, and
    wherein the sequence of expanding the first initial search range outward is based on a distance weighted spiral pattern.

5. The motion estimation method as claimed in claim 4, wherein the distance weighted spiral pattern follows a clockwise order.

6. The motion estimation method as claimed in claim 4, wherein the distance weighted spiral pattern follows a counter-clockwise order.

7. A motion estimation method utilizing a modified rhombus pattern search for a succession of frames in a digital coding system, comprising:
    a) with reference to a first block in a first frame, searching within at least a portion of a second frame for a second block that corresponds to the first block; and
    b) estimating a motion vector of the first block with respect to the second block in the second frame;
    wherein step a) includes: a1) forming a first initial search range including a virtual rhombus-shaped pattern substantially centered at a pre-determined block, and a2) expanding progressively outward a second initial search range based on the virtual rhombus-shaped pattern, and
    wherein step a) further includes a3) forming and searching an expanded search range, which is a rhombus-shaped search range that is centered at a latest best matched block and that overlaps partly a previous expanded search range, if the latest best matched block is found to be on a boundary of the previous expanded search range.

8. The motion estimation method as claimed in claim 7, wherein step a3) if the latest best matched block locates on the boundary of the virtual rhombus-shaped pattern, the unsearched candidate blocks on the boundary of the expanded search range are searched.

9. The motion estimation method as claimed in claim 7, wherein step a3) the candidate blocks in the inner part of the expanded search range are searched only when the latest best matched block is found not to be on the boundary of the expanded search range.

* * * * *